(12) United States Patent
Kim et al.

(10) Patent No.: US 7,156,892 B2
(45) Date of Patent: Jan. 2, 2007

(54) FILTER PROTECTION DEVICE FOR PREVENTING DAMAGE TO AN AIR FILTER

(75) Inventors: Dae-Won Kim, Yongin (KR); Jung-Sung Hwang, Suwon (KR); Tae-Hyup Kim, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/684,409

(22) Filed: Oct. 15, 2003

(65) Prior Publication Data
US 2004/0103628 A1 Jun. 3, 2004

(30) Foreign Application Priority Data
Oct. 26, 2002 (KR) .................. 10-2002-0065650

(51) Int. Cl.
*B01D 46/10* (2006.01)
(52) U.S. Cl. .............. 55/521; 55/385.1; 55/385.2; 55/506; 55/511; 55/DIG. 29; 55/DIG. 31; 55/DIG. 35; 55/309; 55/495; 55/497; 454/292; 454/296; 454/324
(58) Field of Classification Search .......... 55/385.2, 55/385.1, 506, DIG. 29, DIG. 31, DIG. 35, 55/511, 521, 309, 495, 497; 454/292, 298, 454/324, 296
See application file for complete search history.

(56) References Cited
U.S. PATENT DOCUMENTS
2,877,863 A * 3/1959 Lurie .................. 55/514
3,216,183 A * 11/1965 Larsson .................. 55/478
6,451,079 B1 * 9/2002 Lange et al. ............ 55/379
6,554,880 B1 * 4/2003 Northcutt ............. 55/385.2

FOREIGN PATENT DOCUMENTS
JP 2-164412 6/1990

* cited by examiner

*Primary Examiner*—Duane Smith
*Assistant Examiner*—Minh-Chau T. Pham
(74) *Attorney, Agent, or Firm*—Lee & Morse, P.C.

(57) ABSTRACT

A filter protection apparatus includes a frame of a closed curve defining an inner space isolated from surroundings, the frame having a shape of a filter securing part for securing an air filter, an attaching part for attaching the frame to a filter securing part, and a protection part, which is coupled on the inner surface of the frame to occupy the inner space with a plurality of minute holes through which air passes, for protecting the filter from damage. In operation, the protection part is able to prevent damage to the filter that may be caused by work instruments during maintenance work.

22 Claims, 14 Drawing Sheets

000

FILTER PROTECTION DEVICE FOR PREVENTING DAMAGE TO AN AIR FILTER

BACKGROUND OF THE INVENTION

1. Field of the Invention

The present invention relates to a filter protection device for use in a clean room. More particularly, the present invention relates to a filter protection device for protecting an air filter in a clean room for fabricating a semiconductor device from external disturbances, such as an unexpected impact thereon.

2. Description of the Related Art

Recently, as semiconductor devices become more highly integrated, higher purity specifications of a clean room, wherein the semiconductor devices are fabricated, have become common. A clean room is a defined space in which various facilities are installed for manufacturing the semiconductor devices, each of the facilities carrying out a respective unit process for manufacturing the semiconductor devices. Accordingly, various types of filters have been installed in air ducts through which a plurality of pollutants, such as harmful gases or particles of dust, are provided to prevent a process failure of the wafer due to contamination. The various filters are classified into categories according to the filtering pollutant. A high efficiency particulate air (HEPA) filter or an ultra low penetrating air (ULPA) filter has been primarily used for capturing a first pollutant of a pulverized material, such as a minute dust in the clean room. In addition, recent clean rooms have been increasingly using a chemical filter to capture a second pollutant of harmful gases.

In order to increase a purity level of the clean room, strict maintenance of an installed filter is needed in addition to high performance of the filter. As the filter filters out the pollutants, the pollutants are settled and stacked up on the filter. Thus, the installed filter needs to be periodically replaced. Therefore, the installed filter is periodically inspected for damage and is then repaired or replaced depending on the results of the inspection, thereby preventing a process failure caused by contamination due to poor filter performance.

However, recent needs for semiconductor devices have diversified and the life cycle of a semiconductor device now has a tendency to be short. Therefore, a layout of the facilities in a clean room is frequently changed to rapidly respond to a market demand for a particular semiconductor device, and the filter is frequently damaged during this layout change. As a result, a processing failure of the wafer is repeatedly generated until the damaged filter is repaired or replaced as a result of a regular inspection of the filter.

FIG. 1 illustrates a plan view of a schematic structure of a conventional clean room.

Referring to FIG. 1, a conventional clean room 90 for manufacturing a semiconductor device has various cells 10 for performing the unit process. The various cells 10 are systematically connected to each other in the clean room. In the clean room, operators move into each of the cells 10 using pathways 30. The cells 10 are systematically coupled to each other for sequentially and repeatedly performing the respective unit processes for manufacturing the semiconductor device. These unit processes may include a deposition process, a photolithographic process, an etching process, an ion implanting process, and a polishing and rinsing process. An outer wall 40 separates the clean room 90 from external surroundings. Each of the cells 10 is divided into a service area (S/A) 101 including a processing part and a wafer transporting part separated by a partition and a process station (P/S) 102. A unit process for manufacturing a semiconductor device is performed in the S/A 101, and the processed wafer is transported between the S/A 101 of different cells through the P/S 102. The operators also work in the P/S 102. Accordingly, a silicon substrate repeatedly passes through unit cells 10 of the clean room 90 during fabrication of a semiconductor device.

The clean room 90 has an internal pressure with a constant difference from the external surroundings. In addition, internal pressure differences are also formed inside the clean room 90 for reducing a failure rate caused by harmful gases and particles. The internal pressure difference in the clean room 90 may be formed by controlling an amount of air supplied to each region of the clean room 90.

FIG. 2 illustrates a cross-sectional view of an exemplary unit cell including a facility for performing a unit process, i.e., one of the sequential processes for manufacturing semiconductor devices.

Referring to FIG. 2, air is supplied through an air guiding part 52 installed at a top portion of the clean room 90, and provided into the P/S 102 and the S/A 101 after the pollutants in the air are filtered through the air filter 60. The air filter 60 may be a HEPA filter or a ULPA filter. Since the processed wafer is transferred in the P/S 102, a class, which is a unit of purity level of a clean room and is defined as a number of particles having a diameter greater than 0.3 μm in 1 cubic meter (1 m$^3$) of air, of the P/S 102 needs to be higher than a class of the S/A 101. Generally, the P/S 102 is formed to be class 1, and the S/A 101 is formed to be class 1000. The wafer is transported into the wafer transporting part 72 through the P/S 102, and is subsequently transported into the processing part 74. The wafer undergoes a particular unit process in the processing part 74. A special air reservoir 76 is installed for supplying clean air only to the wafer transporting part 72 and the processing part 74. The air supplied through the air guiding part 52 is exhausted through a plurality of exiting tubes 54 installed at a bottom portion of the clean room 90, thereby completing an air circulation cycle.

FIG. 3 illustrates an exemplary installation of a conventional air filter.

Referring to FIG. 3, a conventional air filter 60 is positioned between the air guiding part and the S/A or the P/S, and filters the air supplied into the S/A or the P/S. The air filter 60 is inserted into a filter fixing part 62 installed on a ceiling of the S/A or the P/S to secure the air filter 60 on the ceiling of the S/A or the P/S. As a result, when the filter is determined to be damaged, the filter may be easily repaired and/or replaced with a new filter. The filter fixing part 62 is installed along a longitudinal and a latitudinal direction of the filter 60.

Each cell in the above-described clean room is arranged for performing a unit process for fabricating a particular semiconductor device, and when the type of semiconductor device to be fabricated is changed, cell arrangement in the clean room needs similarly requires change. Recent diversified demand for semiconductor devices and shortened life cycle of the semiconductor device necessitate more frequent rearrangement of the cells in the clean room, so that processing facilities and the partitions are reinstalled in the clean room 90. Therefore, the more frequent rearrangement of the cells results in more frequent occurrence of damage to a filter. In addition, a process failure rate is rapidly increased in a cell including a damaged filter, and an additional cost is added for repairing and replacing the damaged filter. Conventional maintenance work in a clean room, such as installing or removing gas pipes, installing or repairing auto-transportation equipments, or replacing with a new fluorescent lamp in the P/S, also causes the above-described filter damage thereby increasing the process failure rate and the maintenance cost.

FIGS. 4A to 4F are photographs showing examples of filter damage. FIGS. 4A and 4B show a filter partially damaged when processing facilities are installed or moved in a clean room. The damaged filter shown in FIGS. 4A and 4B needs to be repaired or replaced with a new filter according to a degree of damage to the filter. FIGS. 4C and 4D show a filter significantly damaged when a long member such as a partition is moved in the clean room. The damaged filter shown in FIGS. 4C to 4D needs to be replaced with a new filter due to the extent of the damage to the filer. FIGS. 4E and 4F show a severely filter damaged by a working instrument such as a support for the partition or a wrench. The damaged filter shown in FIGS. 4E and 4F requires replacement due to the severity of the damage.

As described above, a damaged filter in a clean room repeatedly causes a process failure, thereby increasing a maintenance cost for the air filter. Filter maintenance costs have increased as the layout of the clean room needs to be more frequently changed in response to recent demand for particular semiconductor devices.

SUMMARY OF THE INVENTION

In an effort to solve at least some of the above problems, the present invention provides a filter protection device that can prevent damage to a filter in a clean room thereby reducing a maintenance cost for the filter and stably maintaining air quality in a cell in the clean room at a high purity level.

According to an exemplary embodiment of the present invention, a filter protection apparatus includes a frame of a closed curve defining an inner space isolated from surroundings, the frame having a shape of a filter securing part for securing an air filter, an attaching part for attaching the frame to the filter securing part, and a protection part, which is coupled on the inner surface of the frame to occupy the inner space with a plurality of minute holes through which air passes, for protecting the filter from damage.

The frame may include a rectangle shape having a pair of first members, each having two ends, disposed parallel to a longitudinal direction, and a pair of second members, each having two ends, disposed parallel to a latitudinal direction, which is perpendicular to the longitudinal direction.

The apparatus may further include a moving member disposed parallel to the latitudinal direction of the frame for moving within a predetermined distance parallel to the longitudinal direction of the frame, wherein the attaching part is coupled to the moving member to cause the attaching part to move together with the moving member.

In an embodiment of the apparatus, both of the pair of first members have ends that are cut off with a predetermined depth from an outer surface thereof and a predetermined length towards the second member to form a notch having a first sectional surface facing an inner surface of the second member and a second sectional surface perpendicular to the first sectional surface, so that the frame includes a groove defined by the inner surface of the second member, the first sectional surface and the second sectional surface of the first member, and the moving member is disposed in the groove.

The moving member may include a body that crosses the inner space parallel to the second member, and a pair of leg portions coupled to the body and disposed in the groove having a width less than a length of the groove, wherein the attaching part is secured to a bottom surface of the leg portion parallel to an upper surface of the first member facing the filter, so that the attaching part moves along the longitudinal direction of the frame as the moving member moves along the longitudinal direction of the frame within the groove.

The apparatus may further include a first supplementary member installed on a lower surface of the first member, which is opposite to an upper surface of the first member, wherein the first supplementary member includes a first face defined by a first normal vector having a direction of a normal vector of the outer surface of the first member, and a second face defined by a second normal vector having a direction of a normal vector of the first sectional surface of the first member; and wherein the moving member is movably coupled to the second face of the first supplementary member by a connecting part.

The connecting part may be an elastic member that is deformable along the longitudinal direction of the frame by an elastic force thereof. The connecting part may be a linear spring.

The apparatus may further include a second supplementary member coupled to a lower surface of the second member parallel to the second member for absorbing an impact on the frame by the moving member. The second supplementary member may include a plurality of second protruding parts coupled to an inner surface of the second supplementary member, the second protruding parts being inserted into an outer surface of the body of the moving member to cause the moving member to move parallel to the second supplementary member.

The first supplementary member may include a first protruding part, which is coupled to the first face for preventing the frame from moving toward the filter, for maintaining a predetermined distance between the protection part and the filter. The first protruding part may be movably coupled to the first supplementary member.

The moving member may further include a power provider for providing the moving member with power. The power provider may be a handle coupled to an inner surface of the moving member for transferring a human power of an operator to the moving member.

The protection part may be formed of aluminum and the frame may be formed of stainless steel.

In view of the above exemplary embodiments, damage to an air filter in a clean room caused by various instruments may be prevented during maintenance in the clean room.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
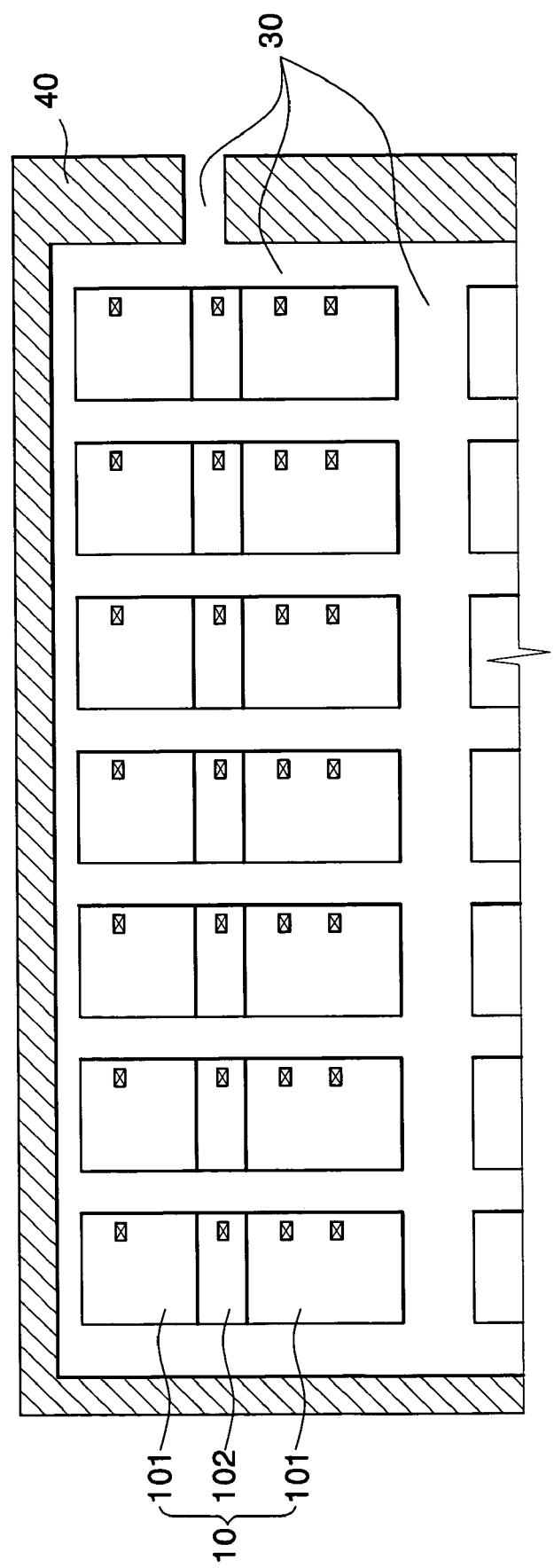
FIG. 1 illustrates a plan view showing a schematic structure of a conventional clean room.
Figure 2:
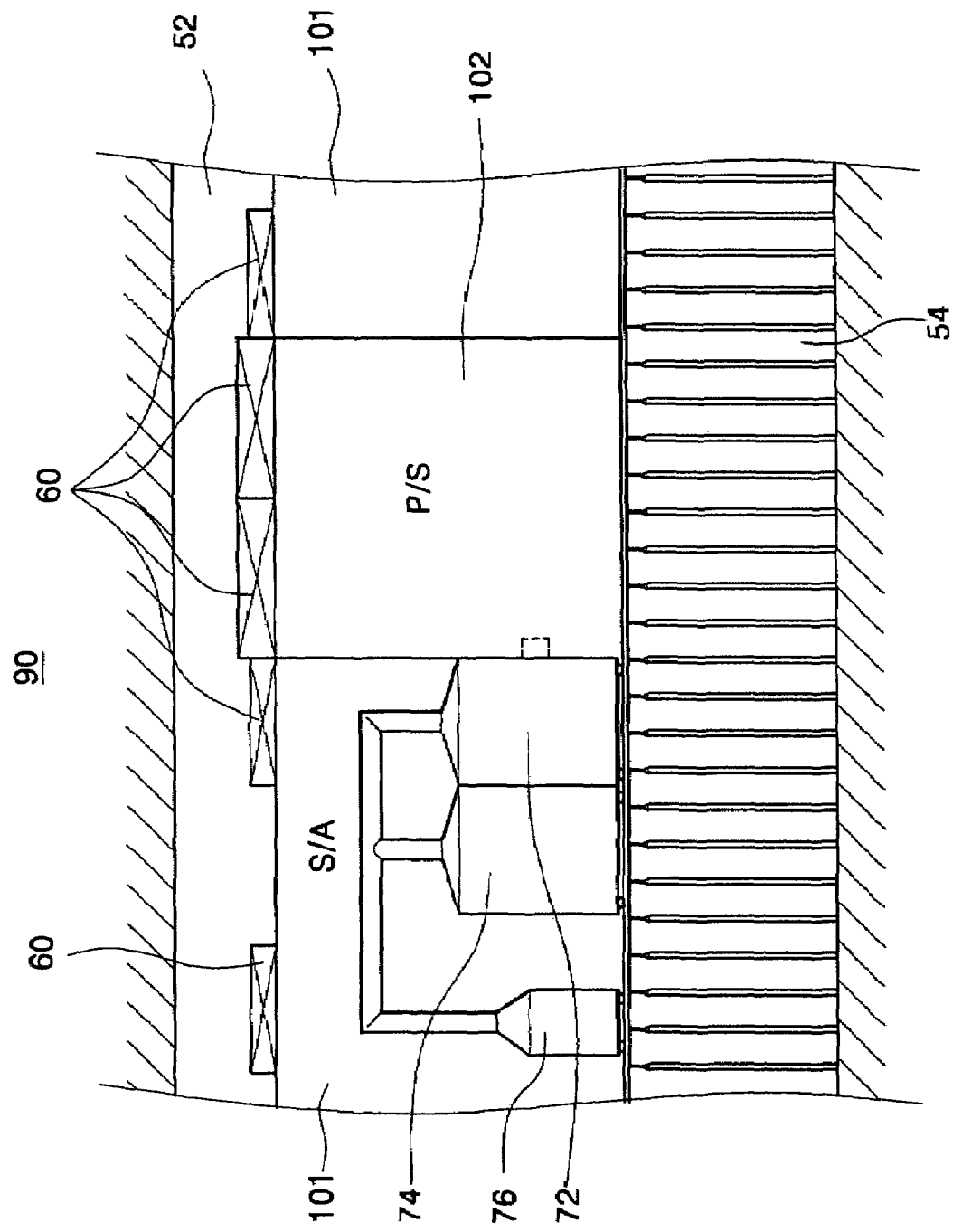
FIG. 2 illustrates a cross-sectional view of an exemplary unit cell including a facility for performing a unit process, i.e., one of the sequential processes in the manufacture of a semiconductor device.
Figure 3:
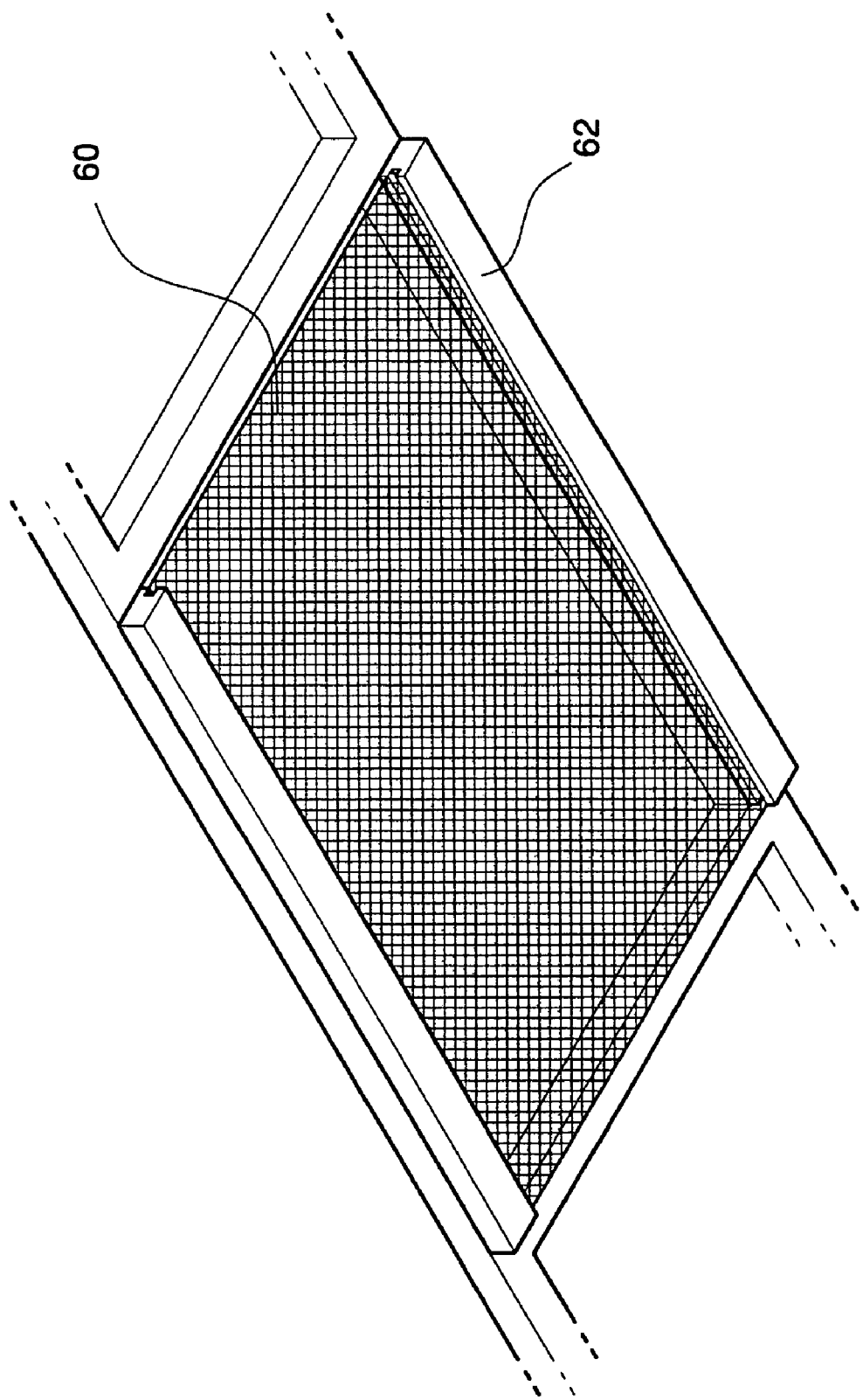
FIG. 3 illustrates an exemplary installation of a conventional air filter.
Figure 4A:
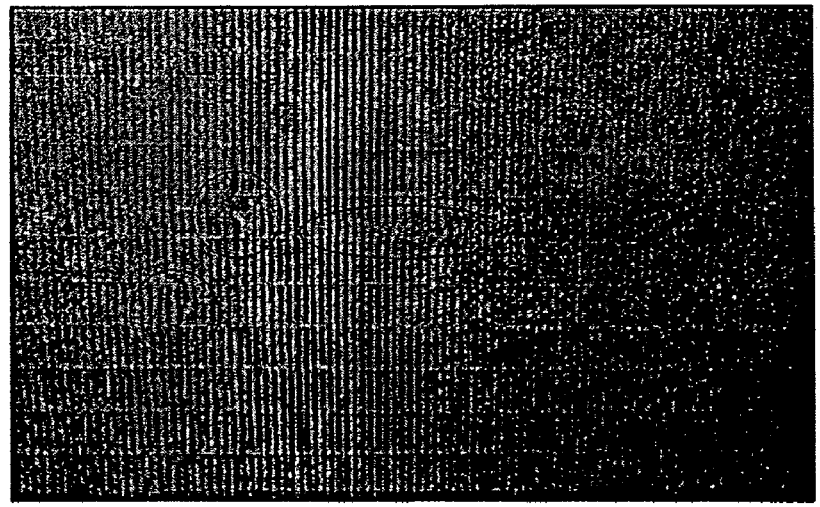
FIGS. 4A to 4F are photographs showing examples of damage to a filter.
Figure 4B:
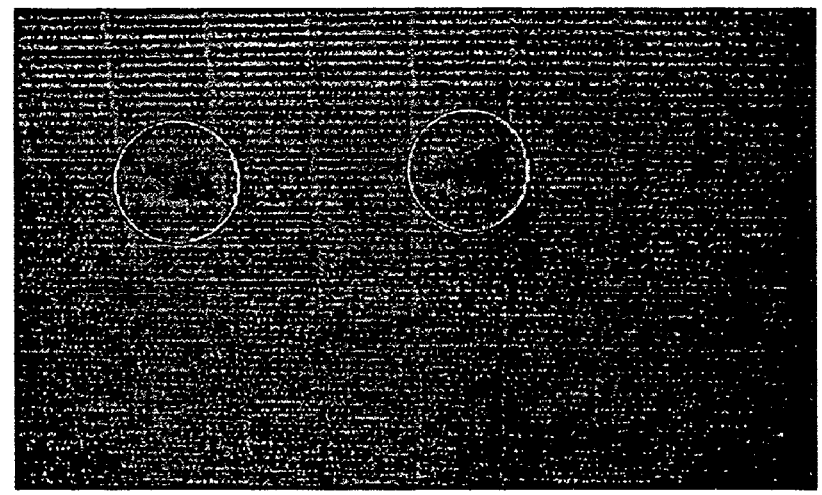
Figure 4C:
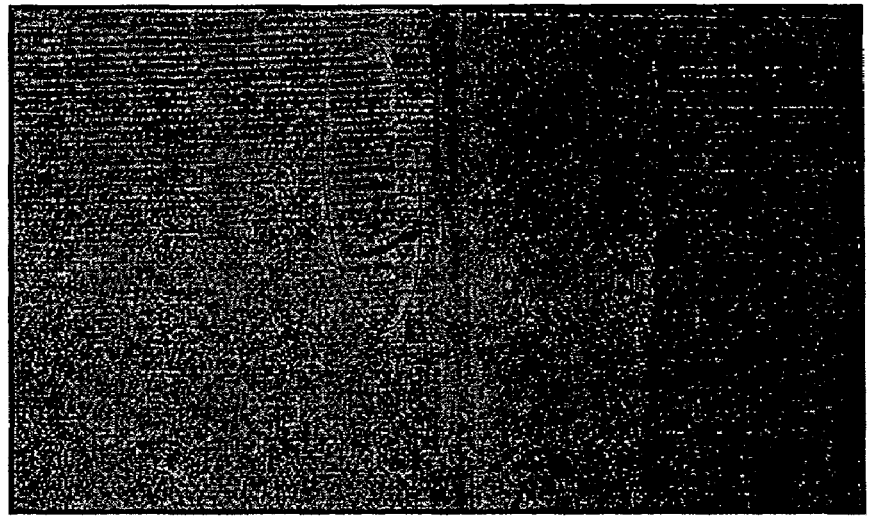
Figure 4D:
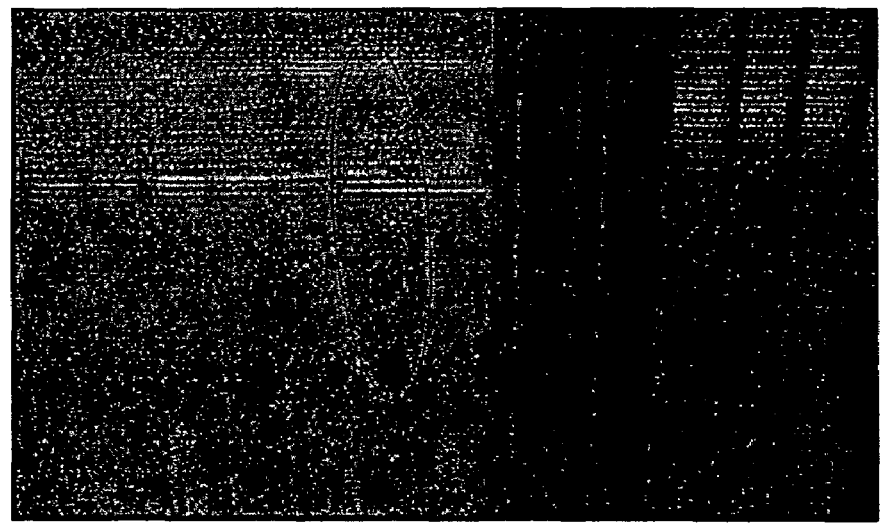
Figure 4E:
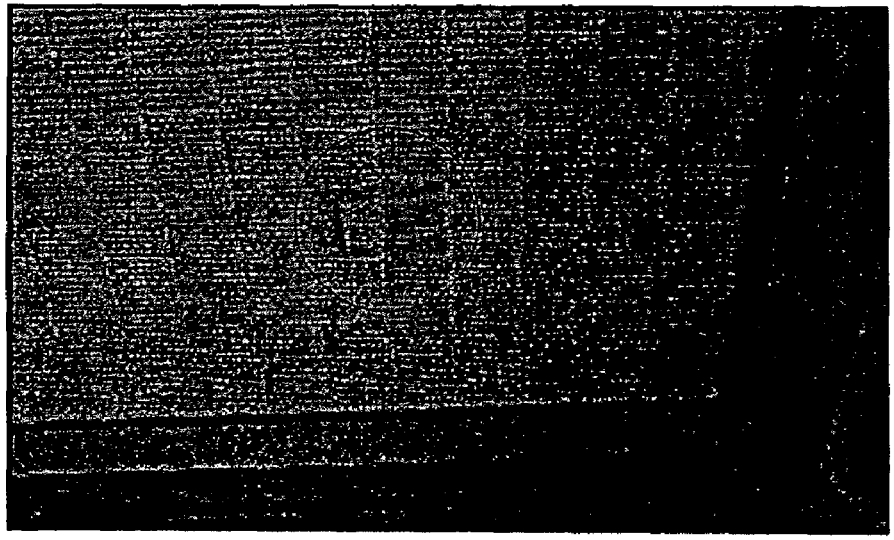
Figure 4F:
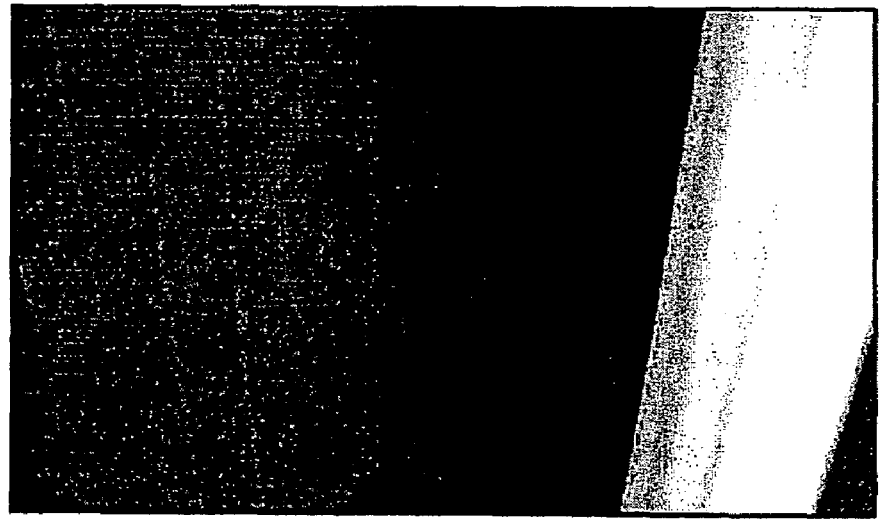

Korean Patent Application No. 2002-65650, filed on Oct. 26, 2002, and entitled; "Filter Protection Device for Preventing Damage to an Air Filter," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like reference numerals and characters refer to like elements throughout.

Figure 5:
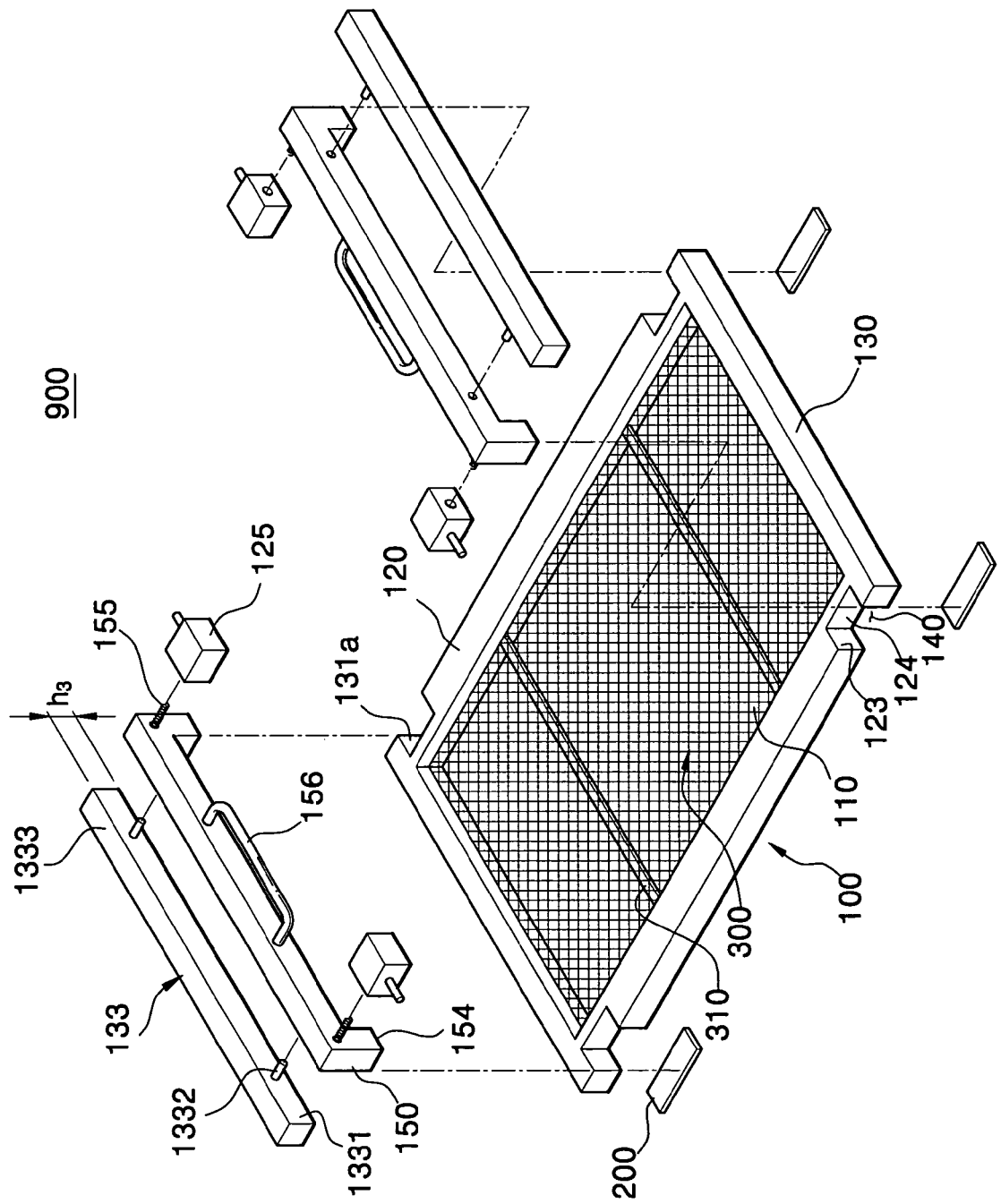
FIG. 5 illustrates an exploded perspective view of a filter protection apparatus according to an exemplary embodiment of the invention.

FIG. 5 illustrates an exploded perspective view of a filter protection apparatus according to an exemplary embodiment of the present invention. In FIG. 5, the filter protection apparatus 900 is depicted inverted to facilitate explanation thereof. Accordingly, an upper surface of an element of a frame 100 faces down as shown in FIG. 5.

Referring to FIG. 5, the filter protection apparatus 900 includes a frame 100 forming an external appearance thereof, an attaching part 200 for attaching the frame 100 to a filter securing part for securing a filter, and a protection part 300 for protecting the air filter from damage caused by external disturbances, such as an external impact on the air filter by a working instrument.

The frame 100 is formed into a shape of corresponding to the filter securing part, and into a closed curve such that an inner space 110 is defined as an isolated space isolated from the surroundings. Accordingly, a size and shape of the frame 100 is determined according to a size and shape of the air filter.

As an exemplary embodiment, the frame 100 is formed into a rectangle having a pair of first members 120 disposed parallel to a longitudinal direction and a pair of second members 130 disposed parallel to a latitudinal direction, which is perpendicular to the longitudinal direction. A pair of grooves 140 is formed at both ends of each of the pair of first members 120.

Figure 6A:
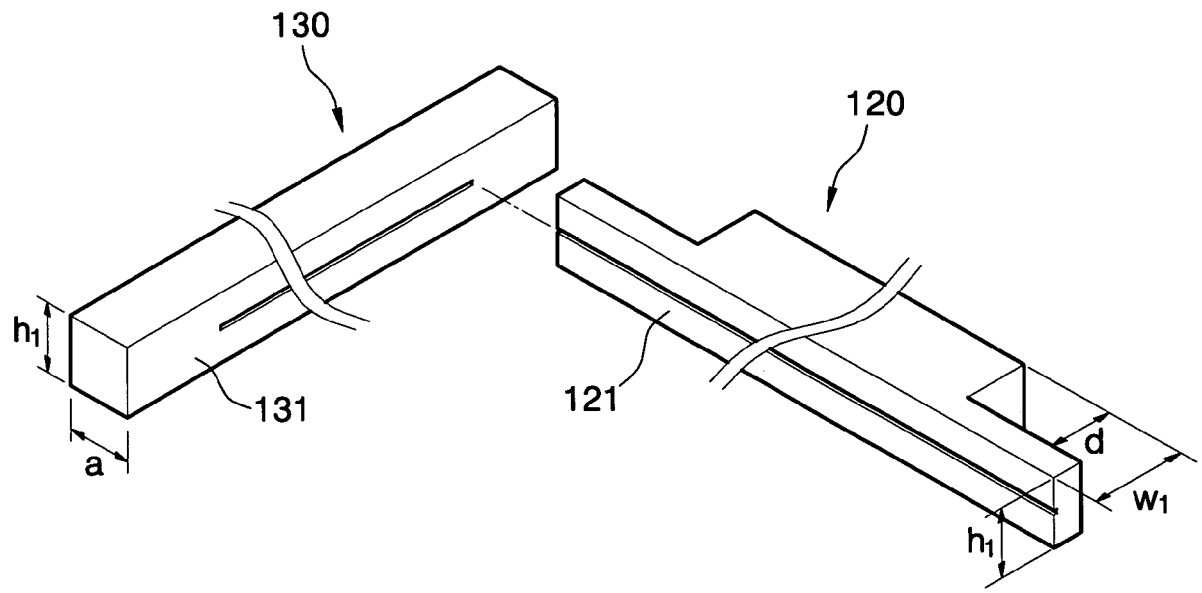
FIG. 6A illustrates an exploded view of the frame shown in FIG. 5.
Figure 6B:
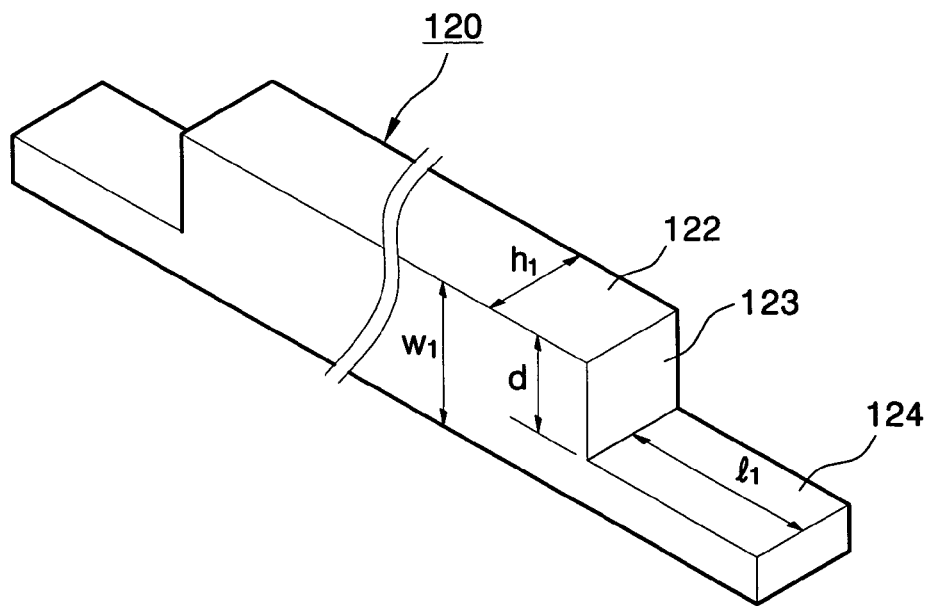
FIG. 6B illustrates a perspective view of the first member shown in FIG. 5.

FIG. 6A illustrates an exploded view of the frame shown in FIG. 5. FIG. 6B illustrates a perspective view showing the first member shown in FIG. 5.

Referring to FIGS. 5, 6A and 6B, the first member 120 is shaped into a bar of a predetermined width $w_1$ and height $h_1$, and has an inner surface 121 facing the inner space 110 and an outer surface 122 (not shown in FIG. 6A) opposite to the inner surface 121. The second member 130 is also shaped into a bar of a predetermined width a and height $h_1$, which is identical to the height of the first member 120, and has an inner surface 131 facing the inner space 110 and an outer surface (not shown in FIG. 6A) opposite to the inner surface 131. Both ends of the first member 120 are cut-off with a predetermined depth d from the outer surface 122 to form a notch including a first sectional surface 123 and a second sectional surface 124. Therefore, the notch has depth d that is less than the width $w_1$ of the first member 120, and a predetermined length $l_1$. When the first and second members are coupled with each other, the groove (140 of FIG. 5) is formed along the longitudinal direction of the frame by the first and second sectional surfaces 123 and 124 of the first member 120 and the inner surface 131 of the second member 130. Although the first and second members may be respectively manufactured and coupled together to form the frame 120, alternatively, the frame may be formed in a body by using a mold for molding the groove, as would be known to one of the ordinary skill in the art.

Referring back to FIG. 5, a moving member 150 that crosses the inner space 110 parallel to the second member 130 is disposed in the groove 140, and moves along the longitudinal direction of the frame 100. The attaching part 200 is secured to the moving member 150 and moves together with the moving member 150. Therefore, when an external force is applied to the moving member 150, the moving member 150 moves along the longitudinal direction of the frame 100 within the groove 140, and the attaching part 200 also moves along the longitudinal direction of the frame 100 together with the moving member 150.

Figure 7:
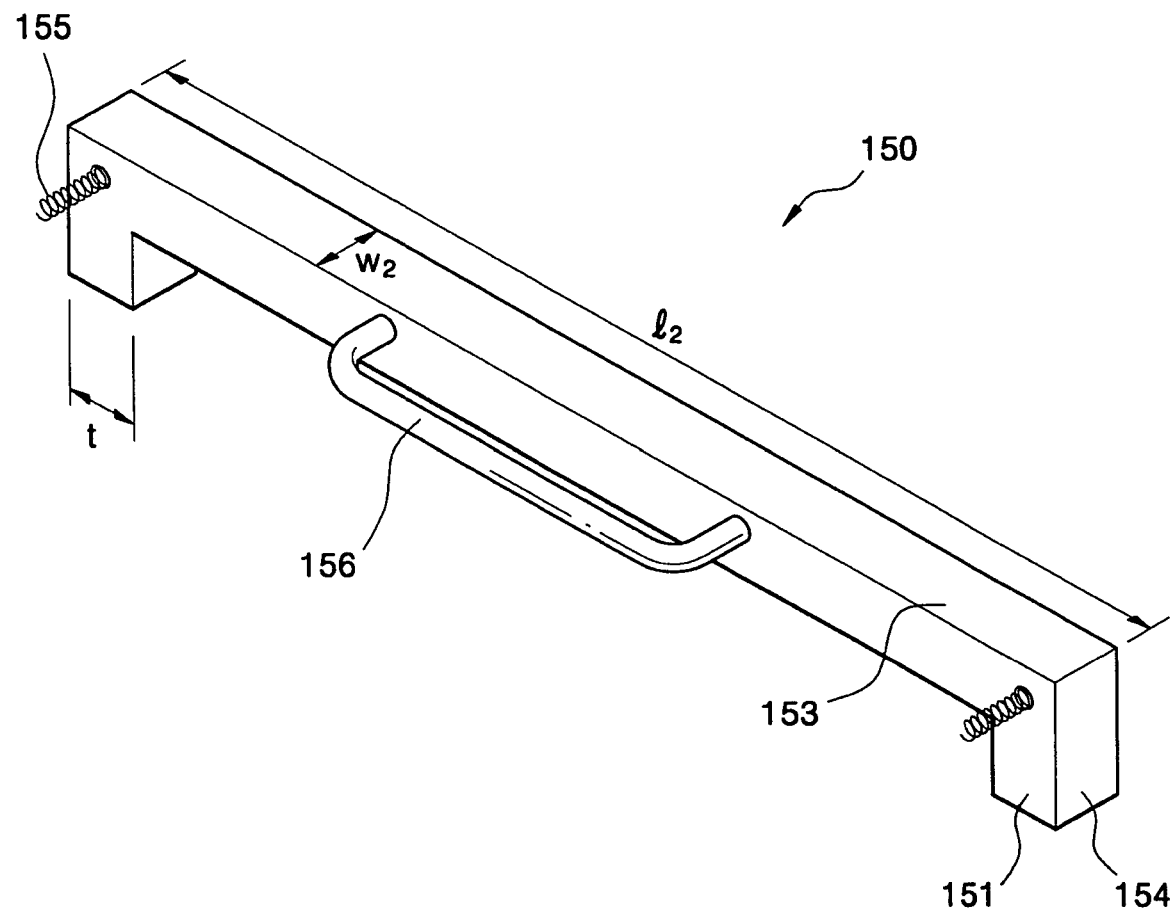
FIG. 7 illustrates an enlarged perspective view of the moving member of the frame shown in FIG. 5.

FIG. 7 illustrates an enlarged perspective view of the moving member of the frame shown in FIG. 5.

Referring to FIGS. 5 and 7, the moving member 150 includes a body 153 that crosses the inner space 110 parallel to the second member 130 and a pair of leg portions 154 coupled to the body 153 and disposed in the groove 140. The body 153 has a width $w_2$ that is less than the length $l_1$ of the groove 140, and a length $l_2$ corresponding to a length of the second member 130. Therefore, the moving member 150 moves within a distance corresponding to a lengthwise difference between the length of the groove 140 and the width $w_2$ of the moving member 150. In addition, each of the leg portions 154 has a thickness t corresponding to the depth d of the groove 140. When the moving member 150 is coupled into the groove 140, each of the leg portions 154 is disposed parallel to an outer surface 122 of the first member 120.

A plurality of connecting parts 155 is installed on an inner surface 151 of the leg portions 154 for securing the moving member 150. A plurality of recessed portions (not shown) is formed on the outer surface of the body 153. When the moving member 150 moves along the longitudinal direction within the groove, a plurality of second protruding parts is inserted into the recessed portions, so that the moving member 150 can move parallel to the second member 130.

As an example, the connecting part 155 may be an elastic member deformable in the longitudinal direction of the frame by an elastic force thereof, and more particularly, may be a linear spring deformable along an axle axis thereof.

In an embodiment of the present invention, a power provider 156 is installed to the inner surface of the body 153 for providing power to the moving member 150. As an example of the power provider 156, a handle is installed on the inner surface of the body 153 for transferring the human power of an operator to the moving member 150. The handle 156 may be formed of stainless steel and secured on the moving member 150.

Referring back to FIG. 5, a first supplementary member 125 as a support for supporting the moving member 150 is disposed on a lower surface of the first member 120, and a second supplementary member 133 is disposed on a lower surface of the second member 133 for absorbing an impact on the frame by the moving member 150.

Figure 8:
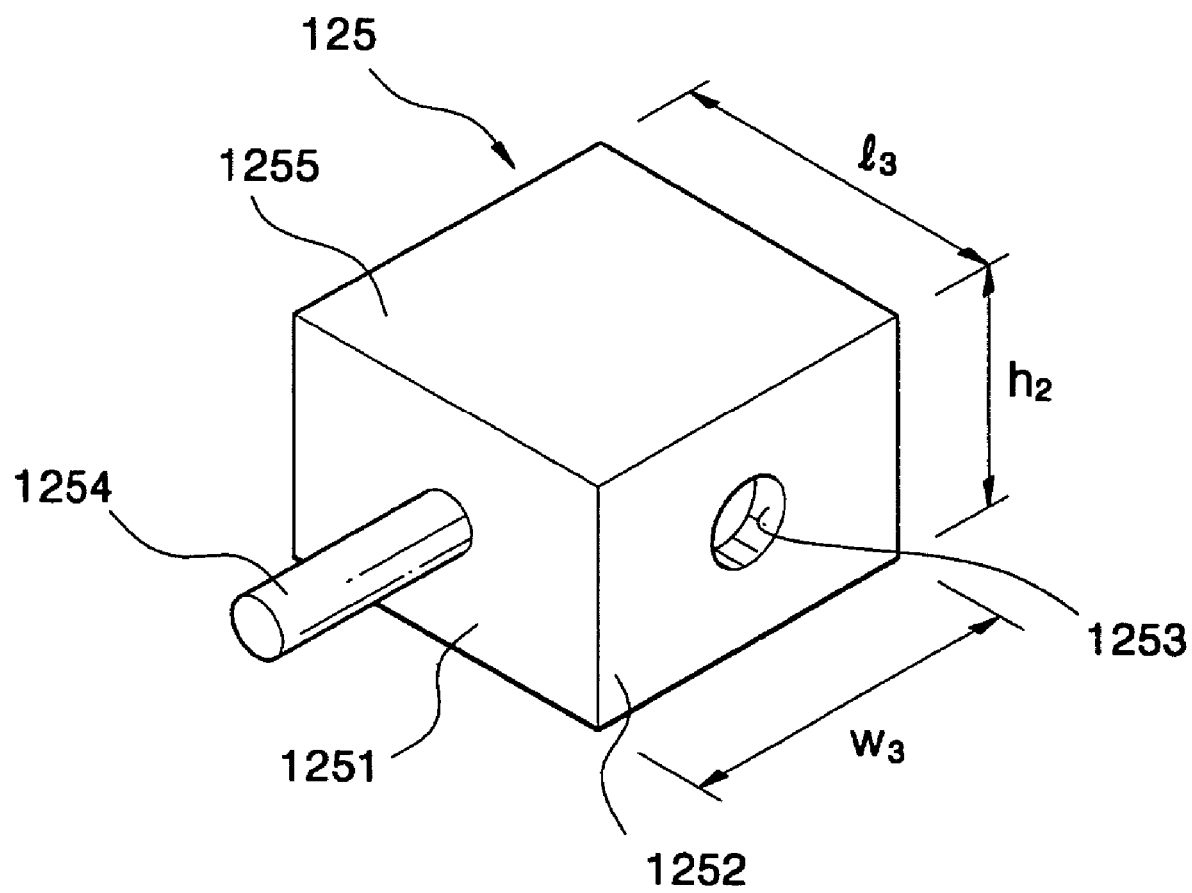
FIG. 8 illustrates a perspective view of the first supplementary member shown in FIG. 5.

FIG. 8 illustrates a perspective view of the first supplementary member shown in FIG. 5.

Referring to FIGS. 5 and 8, the first supplementary member 125 has a width $w_3$ corresponding to the width $w_1$ of the first member 120, a predetermined length $l_3$, and a height $h_2$ such that a top surface of the body 153 of the moving member 150 coincides with a top surface 1255 of the first supplementary member 125. The first supplementary member 125 also has a first face 1251 defined by a first normal vector having a direction of a normal vector of the outer surface 122 of the first member 120, and a second face 1252 defined by a second normal vector having a direction of a normal vector of the second sectional surface 123 of the first member 120. Accordingly, the first supplementary member 125 is installed on the lower surface of the first member 120 such that the second face 1252 coincides with the second sectional surface 123 of the first member 120.

An opening portion 1253 is formed at a center portion of the second face 1252 of the supplementary member 125, and the connecting part 155 installed on the inner surface 151 of the leg portion 154 is removably secured into the opening portion 1253. The connecting part 155 is inserted into the opening portion 1253 and is secured inside the opening portion 1253, SO that the moving member 150 is coupled with the first supplementary member 125, and as a result, the moving member 150 is coupled with the frame 100. In addition, a first protruding part 1254 outwardly protrudes from a center portion of the first face 1251. The first protruding part 1254 extends farther out than the outer surface 122 of the first member 120 to be caught on the filter securing part. In an embodiment of the present invention, the first protruding part 1254 is coupled to the first face 1251 such that the first protruding part 1254 can move in and out of the first face 1251. When the frame 100 is not needed to catch on the filter securing part, the first protruding part may be filly inserted into the opening portion 1253 and be secured inside the opening portion 1253. As an exemplary embodiment, the first protruding part 1254 is coupled using an elastic securing member in the opening portion 1253. Therefore, the first protruding part 1254 is pushed into the first face 1251 when an external force is applied to the first protruding part 1254, and the first protruding part 1254 springs up from the first face 1251 by a restitution force of the elastic securing member in the opening portion 1253 to catch the frame on the filter securing part.

Referring again to FIG. 5, in an exemplary embodiment, the second supplementary member 133 is a hexahedron having a predetermined width and length identical to the width and length of the second member 130, and a height $h_3$ such that the top surface of the body 153 of the moving member 150 coincides with a top surface 1333 of the second supplementary member. A plurality of second protruding parts 1332 is secured on an inner surface 1331 of the second supplementary member 133 to cause the moving member 150 to move parallel to the second supplementary member 133. The second protruding parts 1332 are inserted into the recessed portion formed on the outer surface of the body 153. Generally, the applied force on the moving member 150 is different from the elastic force applied on the connecting part 155, and the force difference causes a rotational moment on the z-axis perpendicular to the first and second members 120 and 130. This rotational moment compels the moving member 150 to move in a direction that is not parallel to the second member 130, and as a result, a shifting distance of the attaching part 200 secured on a bottom surface of the leg portion 154 is made different at both ends of the second member 130. The second protruding parts 1332 prevents the rotational moment from applying on the moving member 150, so that the moving member 150 can move parallel to the second member 130.

Figure 9:
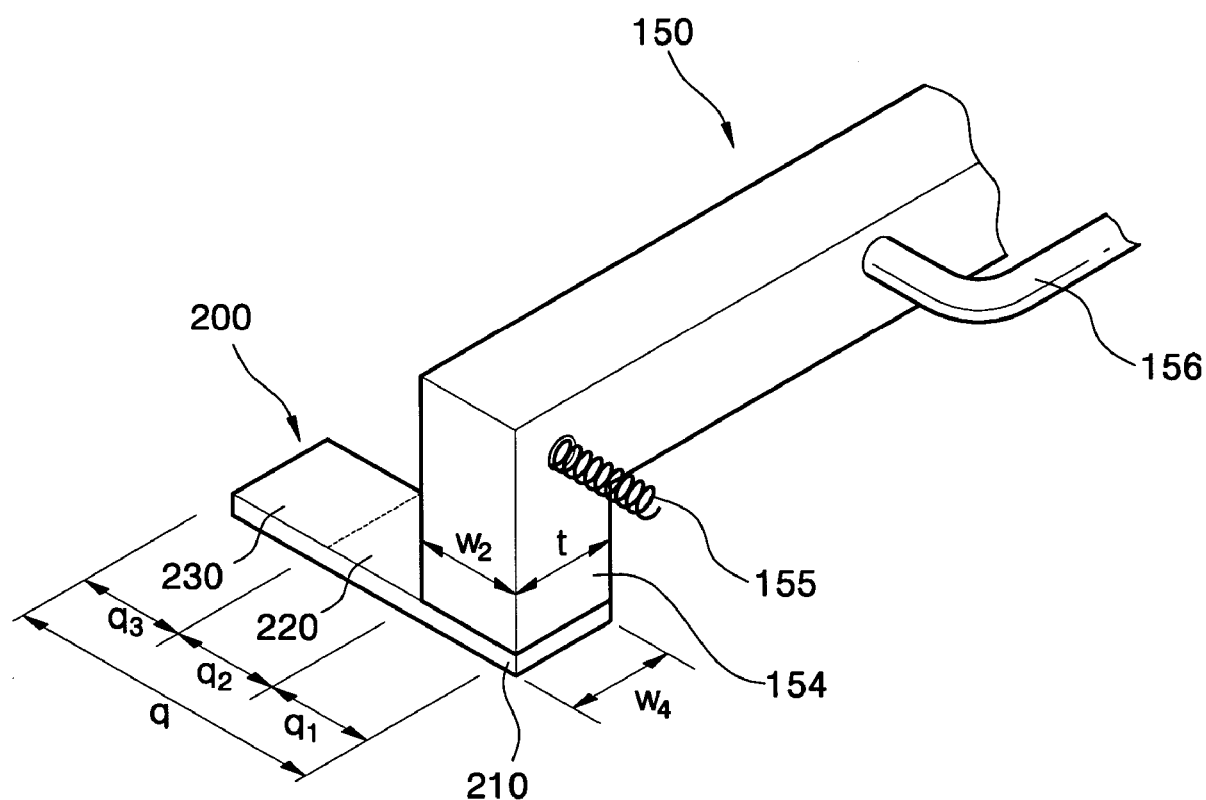
FIG. 9 illustrates a perspective view of a coupling structure between the moving member and the attaching part shown in FIG. 5.

FIG. 9 illustrates a perspective view showing a coupling structure between the moving member 150 and the attaching part 200 shown in FIG. 5.

Referring to FIG. 9, in an exemplary embodiment, the attaching part 200 is a plate having a predetermined thickness and a width $w_4$ corresponding to the thickness t of the leg portion 154. The attaching part 200 is divided into a securing area 210, frame area 220 and a catch-on area 230. The securing area 210 is secured on a bottom surface of the leg portion 154. The frame area 220 corresponds to a projecting surface of the second member 130 on the z-axis. The catch-on area 230 directly contacts the filter securing part to catch the filter securing part, and as a result, the frame 100 is caught on the filter securing part. Thus, a length q of the attaching part 200 is divided into a length $q_1$ of the securing area 210 corresponding to the width $w_2$ of the moving member 150, a length $q_2$ of the frame area 220 corresponding to the width a of the second member 130, and a length $q_3$ of the catch-on area 230.

In an exemplary embodiment, the length $q_3$ of the catch-on area 220 is formed to be equal to the lengthwise difference between the length $l_1$ of the groove and the width $w_2$ of the moving member 150. When the connecting part 155 is pushed into the opening portion of the first supplementary member 125 by an external force to thereby move the moving member 150 along the longitudinal direction, the catch-on area 230 moves into the projecting surface of the second member 130 on the z-axis, and the frame area 220 moves into a portion of the groove 140 defined between the inner surface 131 of the second member 130 and outer surface of the leg portion 154.

When the moving member 150 contacts the second member 130, the attaching part 200 is outwardly extended from the frame 100 to be caught on the filter securing part, so that the frame can be caught on the filter securing part. Meanwhile, when the moving member 150 contacts the first sectional surface of the first member 120, the attaching part 200 is disposed on the upper surface of the second member 130, so that the frame is not caught on the filter securing part.

As an example, the first and second members 120 and 130, the first and second supplementary member 125 and 133, and the attaching part 200 may be formed of stainless steel having a good endurance and strength with a good corrosion resistance.

The protection part 300 is secured along inner surfaces of the first and second members 120 and 130 and occupies the inner space 110. As an exemplary embodiment, the protection part 300 is a protection net with a plurality of holes through which filtered air passes. A plurality of penetrating potions (not shown) is also formed on the inner surfaces of the first and second members 120 and 130, which define the inner space 110, to secure the filter protection net 300. Accordingly, strings of the filter protection net 300 penetrate the penetrating portions, so that the filter protection net 300 is secured on the first and second members 120 and 130. In an exemplary embodiment, at least one guide 310 is installed across the inner space 110 parallel to the second member 130 to prevent the filter protection net 300 from sagging down by the weight thereof and to constantly maintain the tension of the filter protection net 300. The filter protection net 300 may be formed of a light material having a good impact-resistance and corrosion-resistance, such as aluminum. Thus, the air filter installed in the clean room is prevented from making direct contact with working instruments.

Figure 10A:
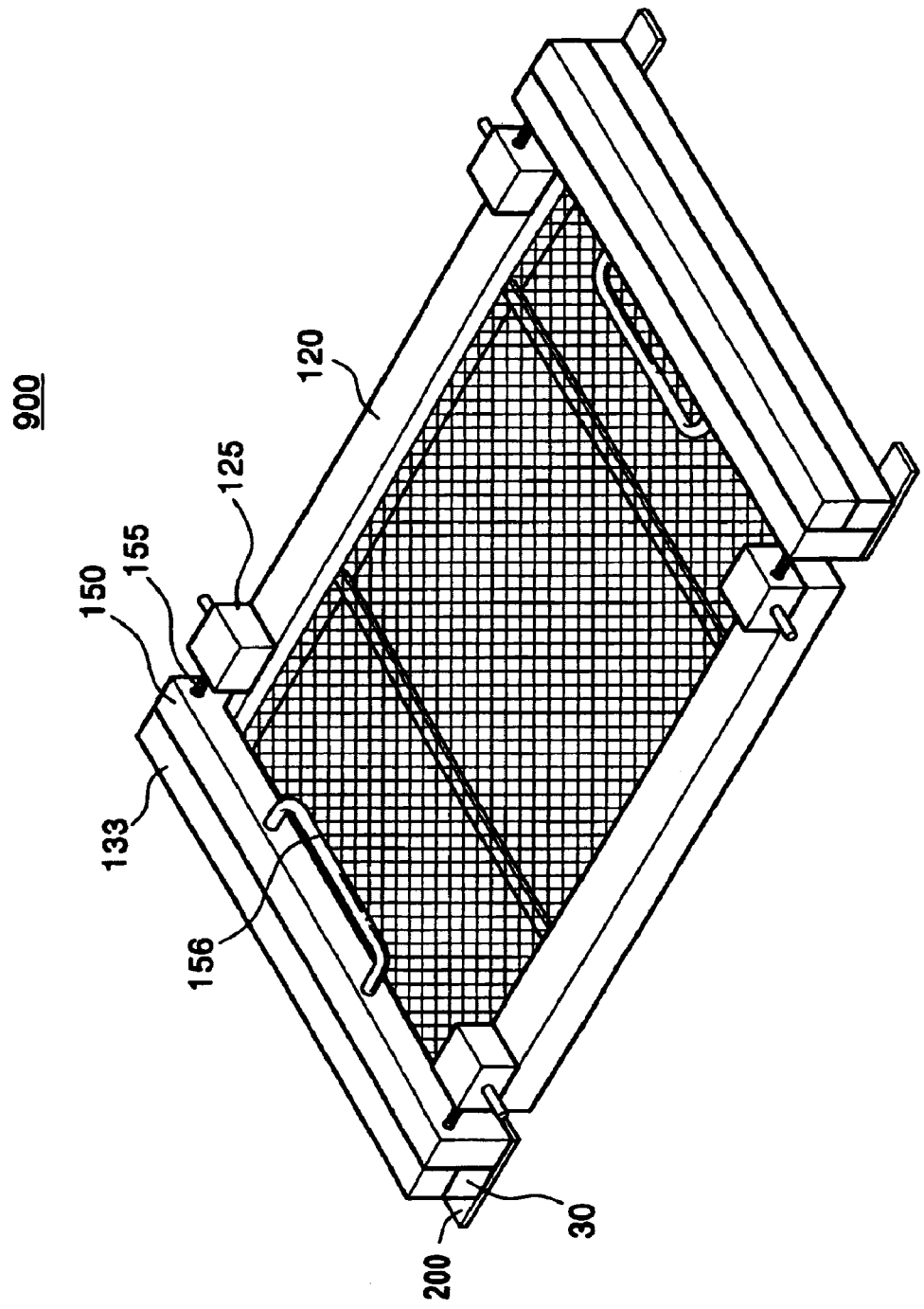
FIG. 10A illustrates a schematic perspective view of a coupling structure of the filter protection apparatus according to an embodiment of the present invention prior to an application of an external force.
Figure 10B:
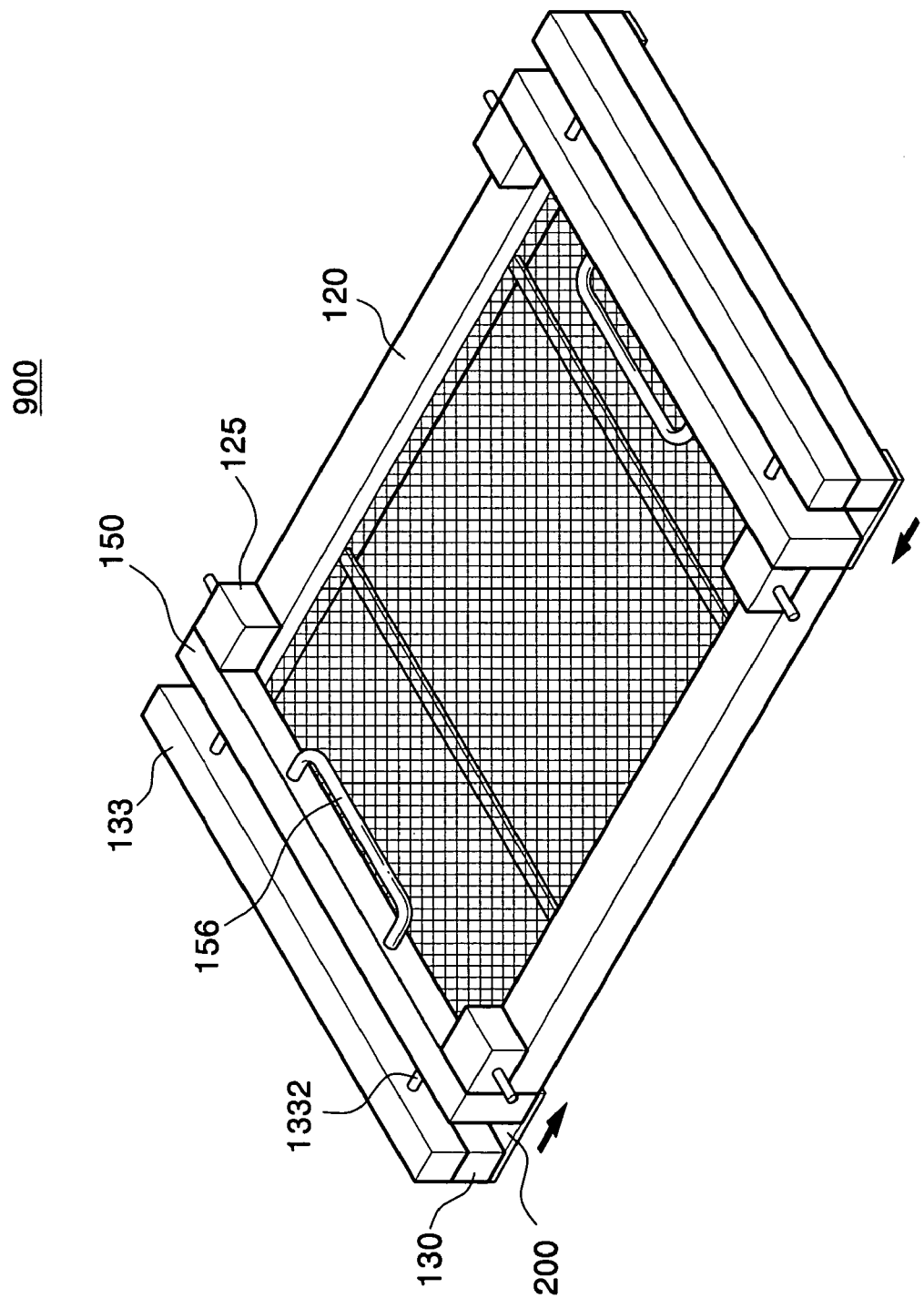
FIG. 10B illustrates a schematic perspective view of a coupling structure of the filter protection apparatus according to an embodiment of the present invention after an application of an external force.

FIG. 10A illustrates a schematic perspective view of a coupling structure of the filter protection apparatus according to an embodiment of the present invention prior to an application of an external force. FIG. 10B illustrates a schematic perspective view of a coupling structure of the filter protection apparatus according to an embodiment of the present invention after an application of an external force.

Referring to FIG. 10A, when the external force is not applied to the filter protection apparatus 900, the moving member 150 contacts the second member 130 due to the restitution force of the spring 155 between the first supplementary member 125 and the moving member 150. Thus, the attaching part 200 extends outwardly over the second member 130. However, when the external force is applied to the handle 156 and the moving member 150 moves toward the center of the inner space 110, the spring 155 is compressed and the moving member 150 contacts the first supplementary member 125 as shown in FIG. 10B. Thus, a space, which is a portion of the groove 140, is formed between the outer surface of the moving member 150 and the inner surface 131 of the second member 130. The second protruding portions 1332 cause the moving member 150 to move parallel to the second member 130.

When the applied force is removed from the handle 156, the moving member 150 is pushed apart from the first supplementary member 125 and returns to contact the second member 130. The second supplementary member 133 absorbs the impact force applied on the second member 130 to thereby minimize the damage to the frame 100.

Figure 11A:
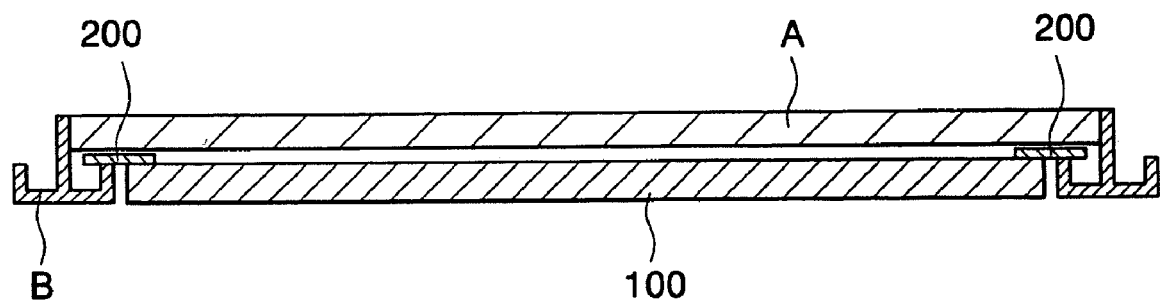
FIGS. 11A and 11B illustrate schematic conceptional views of the coupling structures of the filter securing part and the filter protection apparatus according to an embodiment of the present invention.
Figure 11B:
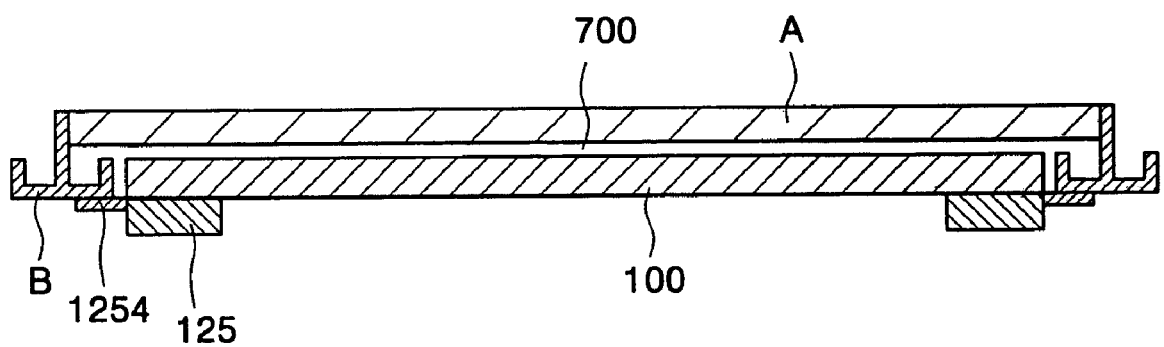

FIGS. 11A to 11B illustrate schematic conceptional views of the coupling structure of filter securing part and the filter protection apparatus according to an embodiment of the present invention. FIG. 11A illustrates a cross-sectional view taken along the first member 120 in FIG. 5. FIG. 11B illustrates a cross-sectional view taken along the second member 130 in FIG. 5.

Referring to FIG. 11A, an air filter assembly includes a filter A for filtering the air supplied into the clean room, and filter securing part B for securing the filter A. The air filter assembly is installed on the ceiling of the clean room, and the attaching part 200 is disposed on an upper surface of the filter securing part B and is caught on the air filter assembly by the load thereof.

When the external force is applied to the handle of the frame, the moving member moves along the longitudinal direction to the center of the frame and contacts the first supplementary member, so that the end portion of the attaching part 200 is disposed on an upper surface of the frame. Therefore, the filter protection apparatus is inserted into the filter securing part. Subsequently, when the applied external force is released, the moving member returns to contact the second member of the frame due to the restitution force of the spring. Thus, the attaching part again extends outwardly over the second member and disposed on the filter securing part, so that the frame is caught on the filter securing part.

The first protruding part 1254 is disposed under the filter securing part B as shown in FIG. 11B. When an external disturbance, such as an impact from a working instrument, is applied to the filter protection apparatus, the first protruding part 1254 prevents the filter protection apparatus from moving toward the air filter A. Moreover, a buffer space 700, which is a space of a predetermined volume for absorbing the external disturbances, is formed between the air filter A and the filter protection apparatus, so that the filter A is protected from the external disturbances. Therefore, the maintenance cost of the clean room can be reduced, and the purity level of the clean room can be increased. The filter protection apparatus can be installed regardless of surrounding restrictions such as a spring cooler, securing members for securing fluorescent lights in the clean room, or various kinds of partitions. In addition, the shape and size of the filter protection apparatus may be easily changed according to the shape and size of the air filter.

Furthermore, the filter protection apparatus can be easily installed or uninstalled in the clean room as needed by the operators. The clean room usually requires various maintenance work for improving work surroundings, such as setting up partitions, changing the layout of the clean room, installing gas pipe lines under the air filter, installing and repairing auto-transmitting devices, or changing fluorescent lights in the clean room. In case of the improvement of the work surroundings, the filter protection apparatus is firstly installed under the air filter, and is easily removed after completion of the maintenance work. Accordingly, even though maintenance work is performed in the clean room, damage to the air filter by work instruments is prevented, and the purity level in the clean room can be also maintained during the maintenance work.

According to the present invention, the filter protection apparatus is detachably installed under the air filter for filtering the air supplied into the clean room. Therefore, a process failure caused by a damaged air filter in the clean room is thoroughly prevented to thereby greatly reduce the air filter maintenance cost. Particularly, the air filter damage caused by the layout change of the clean room can be prevented. Therefore, the filter protection apparatus of the present invention has a significant effect on reducing the filter maintenance cost and the process failure rate considering that the layout of the clean room needs to be very frequently changed for responding to the market demand for the semiconductor devices.

Meanwhile, recent technology trends for fabricating the semiconductor devices require higher purity levels since the pattern on the wafer becomes more fine and the size of the wafer is significantly increased due to nano-technology, which can process materials on nano-scale views. A 300 mm wafer is transferred into the processing part of the clean room via an equipment front-end module (EFEM). However, the room height of the EFEM is similar to the height of the operator working therein, so that the air filter usually directly contacts the operator. When the maintenance work is performed in the EFEM room, the filter damage caused by the direct contact with the operator as well as the filter damage caused by working instruments has a significant effect on process failure. The filter protection apparatus may be more useful for filtering the air supplied into the EFEM room.

Exemplary embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A filter protection apparatus, comprising:
    a frame of a closed curve defining an inner space isolated from surroundings, the frame having a shape of a filter securing part for securing an air filter;
    an attaching part for attaching the frame to the filter securing part; and
    a protection part, which is coupled on the inner surface of the frame to occupy the inner space with a plurality of minute holes through which air passes, the protection part being spaced a predetermined distance away from the filter to protect the filter from damage.

2. The filter protection apparatus as claimed in claim 1, wherein the frame comprises:
    a rectangle shape having a pair of first members, each having two ends, disposed parallel to a longitudinal direction, and a pair of second members, each having two ends, disposed parallel to a latitudinal direction, which is perpendicular to the longitudinal direction.

3. The filter protection apparatus as claimed in claim 2, further comprising:
    a moving member disposed parallel to the latitudinal direction of the frame for moving within a predetermined distance parallel to the longitudinal direction of the frame, wherein the attaching part is coupled to the moving member to cause the attaching part to move together with the moving member.

4. The filter protection apparatus as claimed in claim 3, wherein both of the pair of first members have ends that are cut off with a predetermined depth from an outer surface thereof and a predetermined length towards the second member to form a notch having a first sectional surface facing an inner surface of the second member and a second sectional surface perpendicular to the first sectional surface, so that the frame includes a groove defined by the inner surface of the second member, the first sectional surface and the second sectional surface of the first member, and the moving member is disposed in the groove.

5. The filter protection apparatus as claimed in claim 4, wherein the moving member comprises:
    a body that crosses the inner space parallel to the second member; and
    a pair of leg portions coupled to the body and disposed in the groove having a width less than a length of the groove,
    wherein the attaching part is secured to a bottom surface of the leg portion parallel to an upper surface of the first member facing the filter, so that the attaching part moves along the longitudinal direction of the frame as the moving member moves along the longitudinal direction of the frame within the groove.

6. The filter protection apparatus as claimed in claim 5, further comprising:
    a first supplementary member installed on a lower surface of the first member, which is opposite to an upper surface of the first member, wherein the first supplementary member includes:
        a first face defined by a first normal vector having a direction of a normal vector of the outer surface of the first member, and
        a second face defined by a second normal vector having a direction of a normal vector of the first sectional surface of the first member; and
    wherein the moving member is movably coupled to the second face of the first supplementary member by a connecting part.

7. The filter protection apparatus as claimed in claim 6, wherein the connecting part is an elastic member that is deformable along the longitudinal direction of the frame by an elastic force thereof.

8. The filter protection apparatus as claimed in claim 6, wherein the connecting part is a linear spring.

9. The filter protection apparatus as claimed in claim 6, further comprising:
    a second supplementary member coupled to a lower surface of the second member parallel to the second member for absorbing an impact on the frame by the moving member.

10. The filter protection apparatus as claimed in claim 9, wherein the second supplementary member comprises:
    a plurality of second protruding parts coupled to an inner surface of the second supplementary member, the second protruding parts being inserted into an outer surface of the body of the moving member to cause the moving member to move parallel to the second supplementary member.

11. The filter protection apparatus as claimed in claim 6, wherein the first supplementary member comprises:
    a first protruding part, which is coupled to the first face for preventing the frame from moving toward the filter, for maintaining a predetermined distance between the protection part and the filter.

12. The filter protection apparatus as claimed in claim 11, wherein the first protruding part is movably coupled to the first supplementary member.

13. The filter protection apparatus as claimed in claim 5, wherein the moving member comprises:
    a power provider for providing the moving member with power.

14. The filter protection apparatus as claimed in claim 13, wherein the power provider is a handle coupled to an inner surface of the moving member for transferring a human power of an operator to the moving member.

15. The filter protection apparatus as claimed in claim 1, wherein the protection part is formed of aluminum, and the frame is formed of stainless steel.

16. The filter protection apparatus as claimed in claim 3, wherein the attaching part comprises:
    a securing area secured on a bottom surface of a leg portion of the moving member;
    a frame area corresponding to a projecting surface of the second member on a Z-axis; and
    a catch-on area for directly contacting the filter securing part to catch the filter securing part, thereby catching the frame on the filter securing part.

17. The filter protection apparatus as claimed in claim 2, wherein the protection part comprises:
    a filter protection net having a plurality of holes through which filtered air passes.

18. The filter protection apparatus as claimed in claim 17, wherein the protection part further comprises:

at least one guide, which is installed across the inner space of the frame parallel to the second member, for preventing the filter protection net from sagging down and for maintaining a tension of the filter protection net.

19. The filter protection apparatus as claimed in claim 1, wherein the attaching part releasably attaches the frame to the filter securing part.

20. The filter protection apparatus as claimed in claim 3, wherein the moving member is operable to disengage the attaching part from the filter securing part, thereby releasing the frame.

21. An air filter protection apparatus for removably attaching to an air filter housing that houses an air filter, the air filter protection apparatus being separate from the air filter housing, the air filter protection apparatus comprising:

a frame including an air filter protection part; and at least one moveable catch attached to the frame and configured to removably attach the air filter protection apparatus to the air filter housing, wherein the air filter protection part is spaced apart from the air filter when the air filter protection apparatus is attached to the air filter housing.

22. The air filter protection apparatus as claimed in claim 21, wherein the at least one moveable catch is disposed along a first face of the frame and the air filter protection apparatus further comprises at least one protrusion disposed along a second face of the frame opposite the first face, wherein the at least one protrusion is configured to engage with the air filter housing when the air filter protection apparatus is attached to the air filter housing such that the at least one protrusion prevents the frame from moving toward the air filter.

\* \* \* \* \*